(12) United States Patent
Chen

(10) Patent No.: US 7,268,860 B1
(45) Date of Patent: Sep. 11, 2007

(54) COLOR MOIRÉ INTERFEROMETRY

(75) Inventor: Tzong H. Chen, Beavercreek, OH (US)

(73) Assignee: Taitec, Inc., Beavercreek, OH (US)

( * ) Notice: Subject to any disclaimer, the term of this patent is extended or adjusted under 35 U.S.C. 154(b) by 333 days.

(21) Appl. No.: 10/945,417

(22) Filed: Sep. 20, 2004

Related U.S. Application Data

(60) Provisional application No. 60/505,783, filed on Sep. 25, 2003.

(51) Int. Cl.
*G01L 1/24* (2006.01)

(52) U.S. Cl. ..................................... 356/35.5

(58) Field of Classification Search ............... 356/35.5, 356/488, 499, 521
See application file for complete search history.

(56) References Cited

U.S. PATENT DOCUMENTS 4,814,601 A * 3/1989 Jones .......................... 250/226

OTHER PUBLICATIONS

Kourouma, Hamed Youssouf Serge. "Design and analysis of an optical detection scheme for micromachined floating-element shear stress sensors". Masters Thesis, University of Florida, 2002.*
Miller, M.F. et al. "Fabry-Perot Pressure Sensor Arrays for Imaging Surface Pressure Distributions". 1997 International Conference on Solid-State Sensors and Actuators, Jun. 16-19, 1997, pp. 1469-1472.*
S. Horrowitz, T. Chen, V. Chandrasekaran, K. Tedjojuwono, T. Nishida, L. Cattafesta and M. Sheplak, "A Micromachined Geometric Moire Interferometric Floating-Element Shear Stress Sensor", 42nd AIAA Aerospace Meeting, Reno, NV Jan. 5-8, 2004.
Naughton, S.W. and Sheplak, M. "Modern Developments In Shear-Stress Measurement," Progress In Aerospace Sciences 38 (2002) 515-570 Pergamon.
Displacement Measurement of a Grating Using Moire Modulation of an Optical Spectrum, by Nakadate (2004).

* cited by examiner

*Primary Examiner*—Gregory J. Toatley, Jr.
*Assistant Examiner*—Michael A Lyons

(57) ABSTRACT

Color-coding is used to simplify the prior art floating-element Moiré shear-stress sensor. The use of color-coding allows conversion of the Moiré sensor into a 2-D area array sensor, provides a simplified method that saves costs associated with data acquisition and analysis and permits the use of color in the mapping of shear stress distribution.

18 Claims, 16 Drawing Sheets

Color coded light source is inserted between Gratings on stationary element of the Moiré

The interference pattern of Moiré fringe

The interference pattern of a shifted Moiré fringe

The interference pattern of color Moiré fringe

The interference pattern of a shifted color Moiré fringe

Color & Intensity Coded Channel Light Source

Comparison of traditional Moiré and color Moiré technique

Traditional Black-and-White Moiré Technique

White Light Source 1  2  3

Moiré "Opening" Position 1  2  3

Pixel Space

Moiré opening position is detected by intensity peak location in pixel space (multiple pixels are required)

Figure 10

Color Moiré Technique

Color Light Source 1 (Blue)  2 (Green)  3 (Red)

  

1  2  3

Single Pixel that Can "See" Color

Moiré opening position is detected by color seen by a single pixel

Figure 11

COLOR MOIRÉ INTERFEROMETRY

This application is a continuation-in-part of Provisional Patent Application Ser. No. 60/505,783 filed by the inventor hereof on Sep. 25, 2003.

FIELD OF THE INVENTION

The present invention relates to Moiré interferometry and interferometers and more particularly to such a method and device that utilizes color coding to measure the phase shift of the Moiré pattern.

BACKGROUND OF THE INVENTION

Moiré interferometry is a technique used to study strains and deformations in structural elements with very high accuracy. Moiré is the generic term for full field measurement techniques that utilize the interference effect between some form of specimen grating and a reference grating to magnify the surface deformations and create a contour map that is related to surface displacement—a Moiré fringe pattern or interferogram. For relatively large displacements, mechanical Moiré uses the interference of lined gratings to achieve sensitivity of measurement of up to 25 μm. The state-of-the-art MEMS technology enables measurement sensitivity of up to 5 nm [Horowitz et. al]. Optical Moiré or Moiré interferometry, in which a diffraction grating is illuminated by laser light, increases the sensitivity to submicron levels, enabling measurement of elastic strains in engineering materials.

The Moiré pattern is a full field representation of the relative displacement between gratings, be they mechanical or optical. This property of Moiré makes it an excellent tool for observing and quantifying the gradients in localized deformation. In practice, a grating is attached to or generated on, in the case of optical interferometry, the surface of the test piece. The grating deforms together with the test piece and when an undeformed reference grating is superimposed onto it, a moiré pattern depicting the nature and magnitude of the deformation field is obtained. Each Moiré fringe represents a line of constant displacement in the direction perpendicular to the direction of the reference grating. Such devices and methods are used for, among other things, the direct measurement of skin friction.

The development of a floating-element shear stress sensor that permits the direct measurement of skin friction based on geometric Moiré interferometry is reported by Prof. Sheplak and his IMG group at the University of Florida, Horowitz, S., Chen, T., Chandrasekaran, V., Tedjojuwono, K., Nishida, T., Cattafesta, L., and Sheplak, M., "A Micromachined Geometric MoiréInterferometric Floating-Element Shear Stress Sensor," AIAA Paper 2004-1042, $42^{nd}$ AIAA Aerospace Sciences Meeting, Reno, Nev., 5-8 Jan., 2004 which is incorporated herein in its entirety for purposes of describing floating-element shear stress sensors of the type in which the invention described herein is particularly useful. As described in detail in the aforementioned publication, this sensor, shown schematically in FIG. 1, is fabricated using an aligned SOI/PYREX® (borosilicate glass) anodic bond, thin-back process that produces aluminum optical gratings on the backside of a 10 mm thick silicon floating element and on the top surface of the Pyrex support wafer.

The device package consists of the sensor die flush-mounted in a Lucite plug with back-side imaging optics and a CCD camera that has an array of 1×1024 pixels. The Moiré fringe pattern is captured using the CCD camera. A least squares fit is then applied to the recorded intensity pattern obtained for a given shear stress input. The least squares procedure fits a sinusoidal intensity pattern to the measured pattern and determines the amplitude, DC offset, frequency and phase of the sinusoid.

As depicted in FIGS. 2 and 3, this procedure is repeated for a given shear stress and the corresponding intensity pattern to obtain the new phase of the shifted sinusoid. From the phase shift, the number of pixels shifted by the Moiré fringe is calculated.

This calibration procedure provides a lookup table to relate shear stress and the phase shift of the Moiré. In addition, using knowledge of the Moiré and optical amplification, the corresponding mechanical displacement of the floating element is computed to give a direct measurement of the wall shear stress.

The fitted data is demonstrated in FIG. 4. The random noise of the data is about 20% of the signal. The error introduced by this noise to the fitting is about 0.13%. This technique is thus very accurate even under noisy signal conditions.

Shortcomings of the above-described prior art system include:

1) for a single sensor, a microscope is required for imaging the CCD array, 1×1024 pixels. In this arrangement, simultaneously probing multiple sensors is possible, however, the arrangement of the CCD array is a major challenge.

2) for a single sensing element, an imaging array is needed to locate the peak intensity of the Moiré. The cost of such an imaging array, including a frame grabber, is approximately $2,000. A special curve fitting chip and electronics add development costs to the current system. These include:
  1. the requirement for a uniform light source which impacts the fitting accuracy.
  2. the requirement for a microscope for CCD imaging which increases the system size.

These and other disadvantages of the prior art system and technique as compared to that of the present invention are presented and discussed in greater detail below.

Thus, there exist significant and costly shortcomings to the "best" prior art systems currently available for obtaining accurate sub-micron shear stress or direct skin friction measurements. In addition to the cost issues, the prior art systems are: 1) not easily used to further increase the accuracy of measurements as miniaturization increases; 2) not readily useful to perform 2-D area sensing using a single unit sensor; and 3) relatively incapable of performing 2-D sensing with high frequency response.

Alternative imaging techniques, such as pressure sensitive paint (PSP) and temperature sensitive paint (TSP), have been developed for pressure and temperature measurements (see Hubner, J., Carroll, B., Schanze, K., Ji, H., and Holden M., "Temperature- and Pressure-Sensitive Paint Measurements in Short-Duration Hypersonic Flow," AIAA 99-0388, $37^{th}$ AIAA Aerospace Sciences Meeting and Exhibit, Reno, Nev., 1999). These technologies are low cost and can take vast amount of data very quickly. The frequency response for those techniques, however, is approximately 1000 Hz. For achieving high frequency response, Miller et. al have developed a 2-D array using a Fabry-Perot interferometry system (see Miller, M. F., Allen, M., Arkilic, E., Breuer, K. S., and Schmidt, M. A., "Fabry-Perot Pressure Sensor Arrays for Imaging Surface Pressure Distributions,") for pressure measurement. According to a recent survey by Naughton and Sheplak (see Naughton, J. W. and Sheplak, M., "Modern Developments in Shear-Stress Measurement," Progress in Aerospace Sciences 38 (2002) 515-570, Pergamon) there is no adequate 2-D shear stress sensor that can probe high frequency response flow characteristics.

OBJECTS OF THE INVENTION

It is therefore an object of the present invention to provide a high frequency response 2-D area sensing Moiré interferometry sensor and method.

It is another object of the present invention to provide such a system and method that is relatively low cost.

It is yet another object of the present invention to provide such a system that is capable of further miniaturization for use in MEMS manufacturing systems.

SUMMARY OF THE INVENTION

According to the present invention, color-coding is used to simplify the prior art floating-element Moiré shear-stress unit described above. The use of color-coding allows conversion of the Moiré sensor into a 2-D area array sensor, provides a simplified method that saves costs associated with data acquisition and analysis and permits the use of color in the mapping of shear stress distribution.

DESCRIPTION OF THE DRAWINGS

FIGS. 10-17 schematically depict a comparison of the traditional prior art white light source Moiré technique and the color Moiré technique of the present invention.

Figure 1:
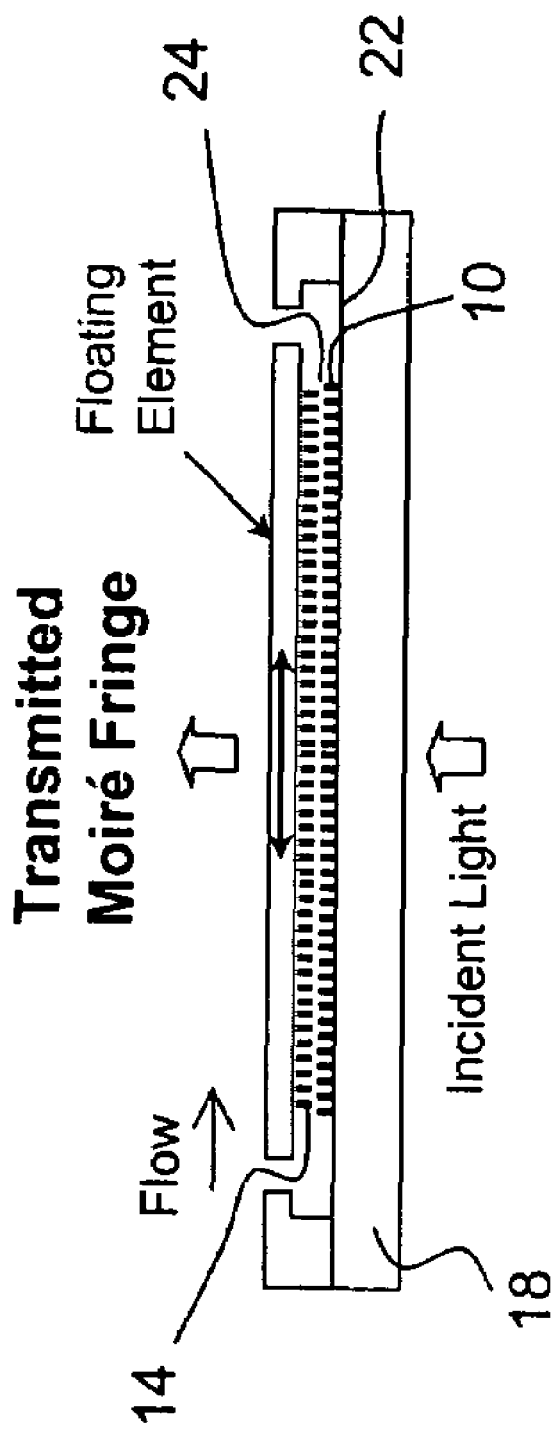
FIG. 1 is a schematic depiction of the Moiré sensor of the prior art.

Floating-element sensors of the type used in the prior art, as depicted in FIG. 1, comprise a translucent floating-element 12, preferably of silicon, suspended above the surface of a translucent wafer 18, preferably of PYREX® (borosilicate glass). The Moiré pattern can be realized by patterning aluminum lines with a different pitch on both the bottom of floating element 12 and on the upper surface 24 of PYREX® wafer 18. When the device is illuminated from below, from light source 30, through PYREX® wafer 18 and floating element 12, light is transmitted by the superposed top and bottom gratings, creating a translation-dependent Moiré fringe pattern.

DETAILED DESCRIPTION

The concept of using a channeled light source was conceived while considering alternatives to the current lighting technique used by Sheplak, et al. The use of a light channel with a white light source (or monochrome source), requires the use of an image array and curve fitting techniques (or envelop detection) to identify the pixel that is associated with the peak signal which, in turn, is used to identify the shear stress. On the other hand, if a color light source is used, the Moiré's peak interference location is revealed by color. The color can be identified by a single pixel of a CCD camera. This results in a reduction in the sensor system data acquisition memory requirement by a ratio of 1024 to 1 when compared to the current technique described above. The time for data acquisition and analysis is likewise reduced. The software for color processing in pixel space is readily available and no development is needed.

Figure 12:
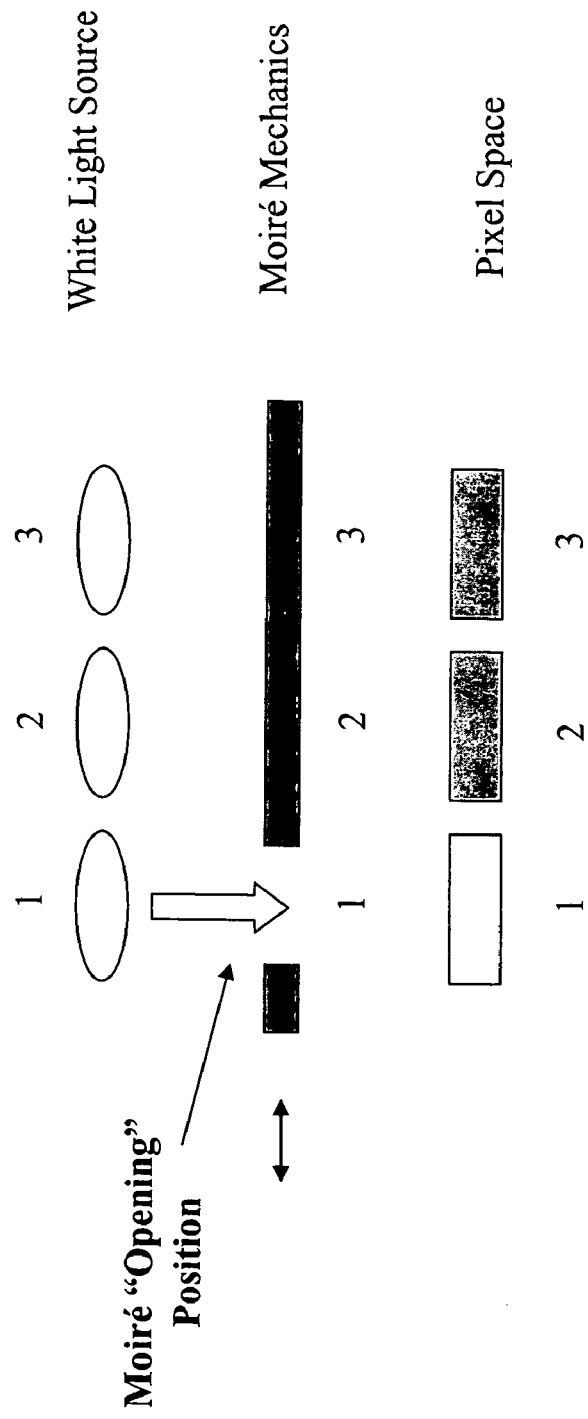
Figure 13:
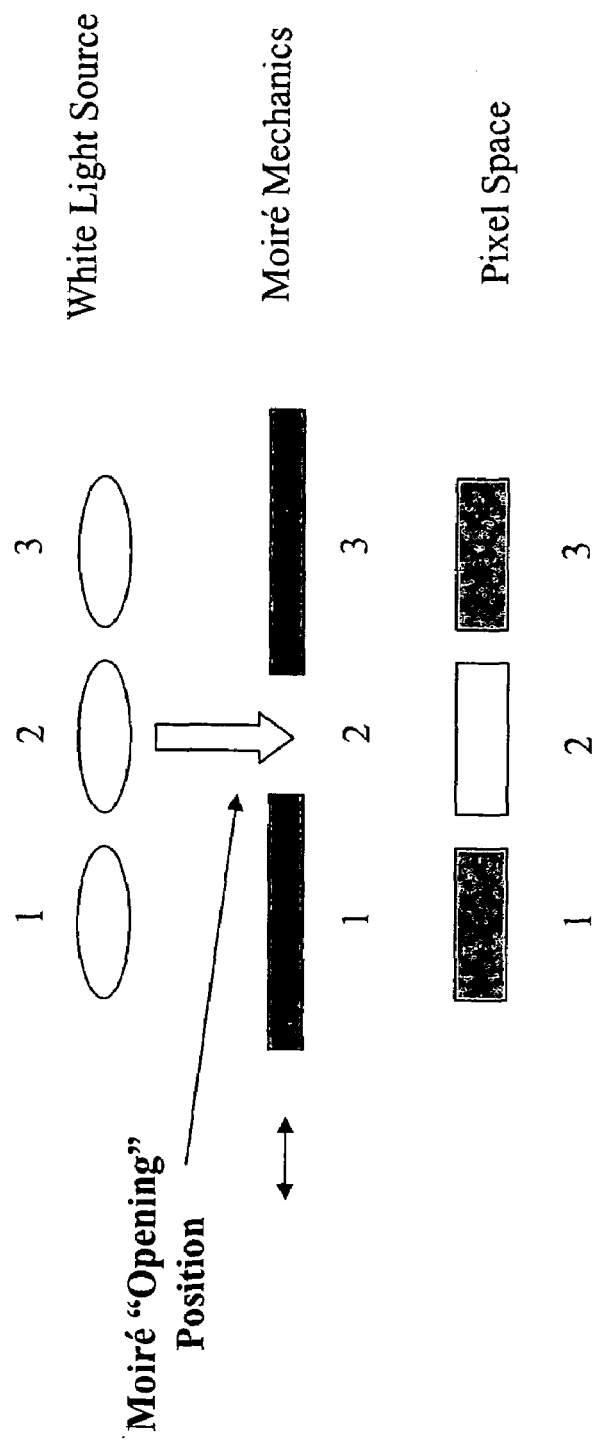
Figure 14:
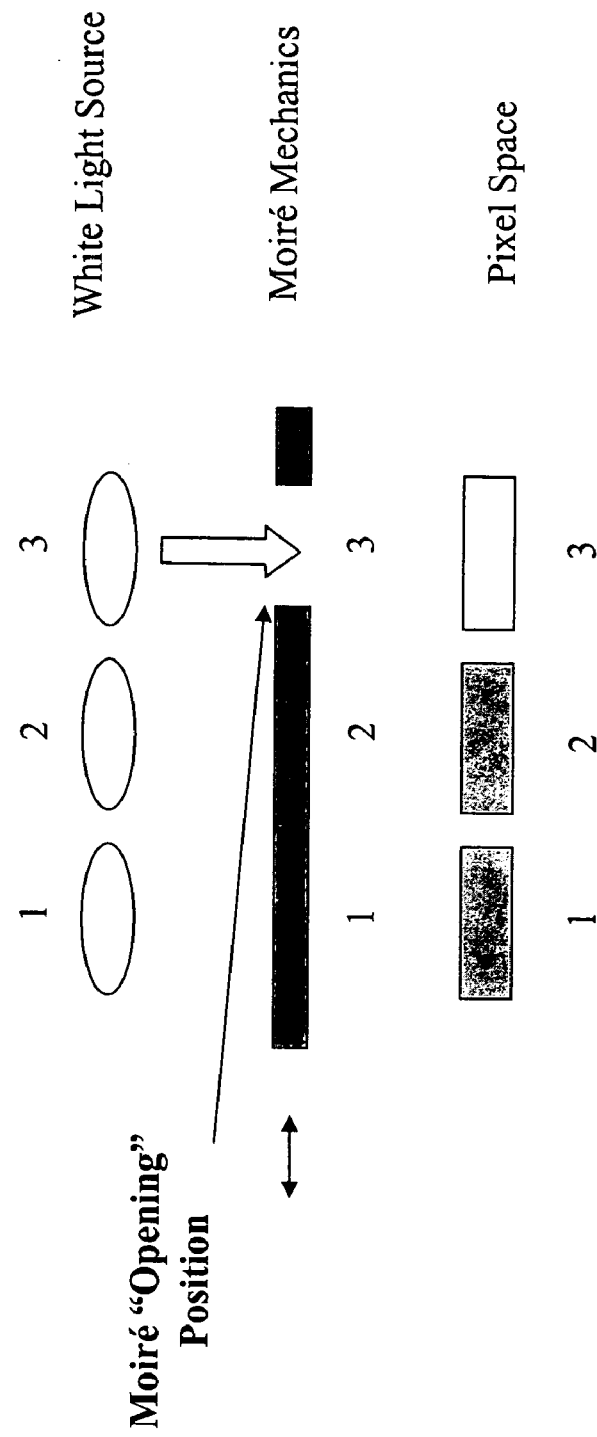
Figure 15:
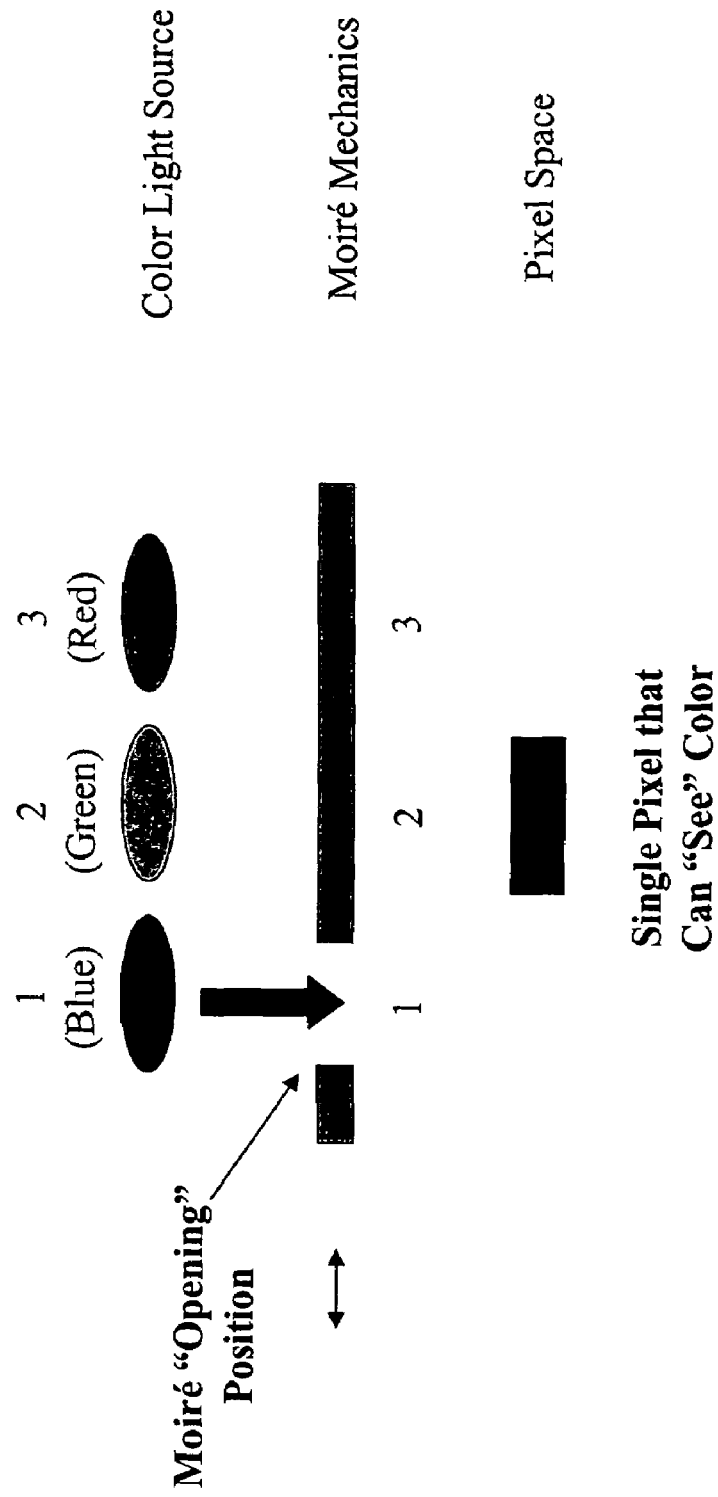
Figure 16:
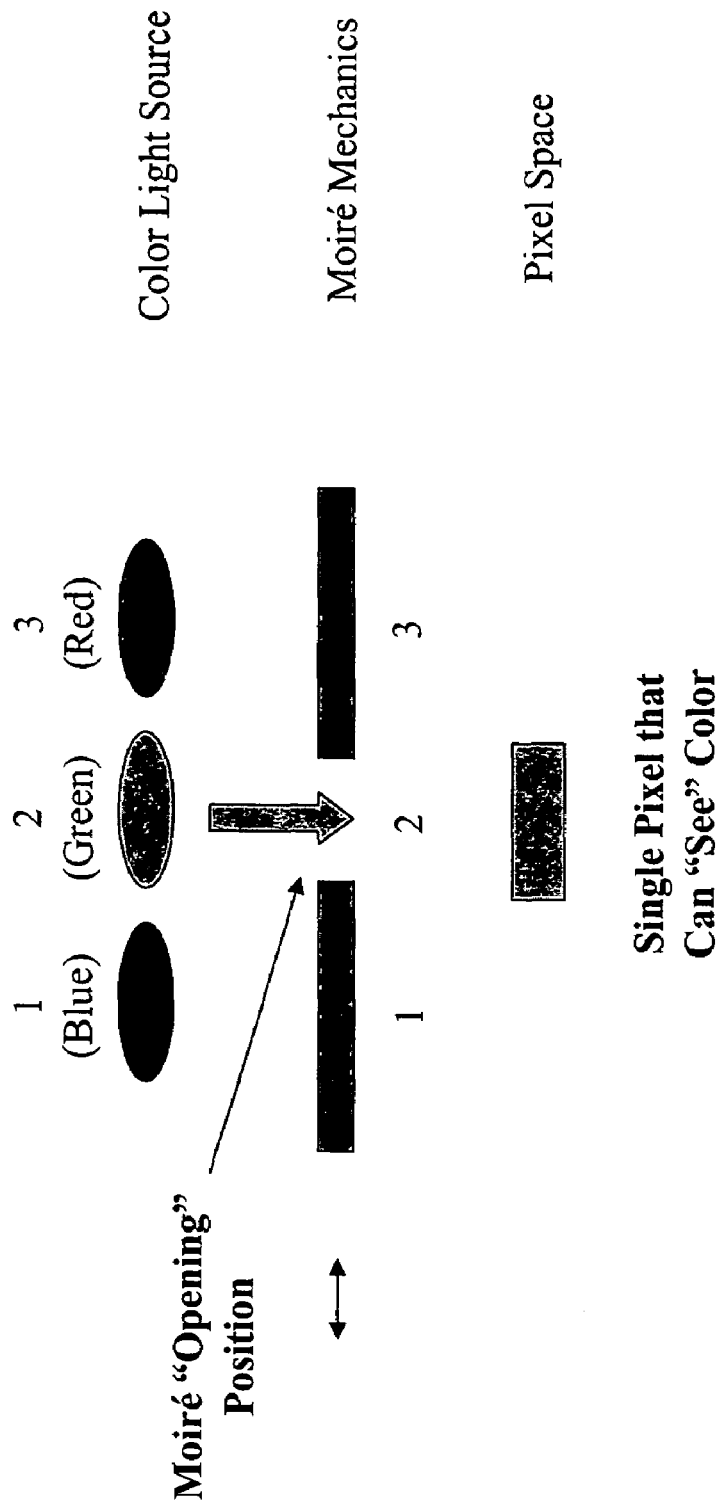
Figure 17:
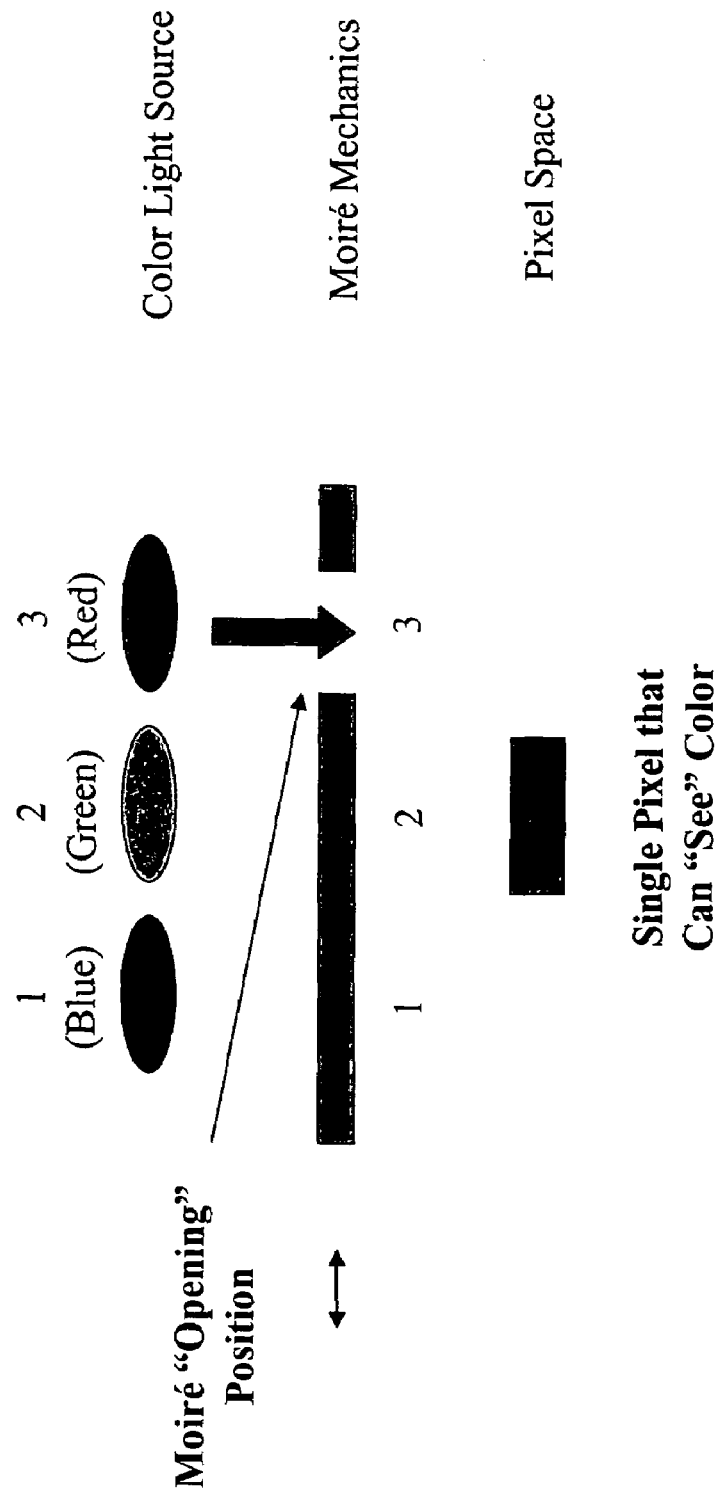

Referring now to FIGS. 10-17 that provide a schematic comparison of the traditional black and white floating-element shear-stress Moiré technique of Sheplak et. al with the floating-element shear-stress color Moiré technique of the present invention, in the traditional technique represented in FIG. 10 white light is projected through a Moiré opening position 3 and is detected by a corresponding pixel 3 that is part of an array of pixels 1-3. In the color Moiré technique of the present invention colored light sources that project, for example, red (R), green (G) or blue (B) light, a single pixel that is color sensitive detects, in the case shown, red light projected through Moiré opening position 3. From this simple comparison, it can be readily seen that the traditional Moiré sensor is considerably simplified with no loss of sensitivity. FIGS. 12-14 depict the operation of the traditional black and white technique for Moiré openings produced through shear movement at various locations along the Moiré mechanics, the grid, and the need for a plurality of pixels to sense or detect such openings. In FIGS. 15-17 that depict the technique of the present invention, it can be readily seen that only a single color sensitive pixel is required to detect colored light regardless of which of the Moiré openings through which light is projected, the color of the light serving to provide the required information as to the location and size (as measured by the intensity of the transmitted light) of the Moiré openings rather than the need for a plurality of "light sensors', i.e. pixels to obtain the same information.

Figure 5:
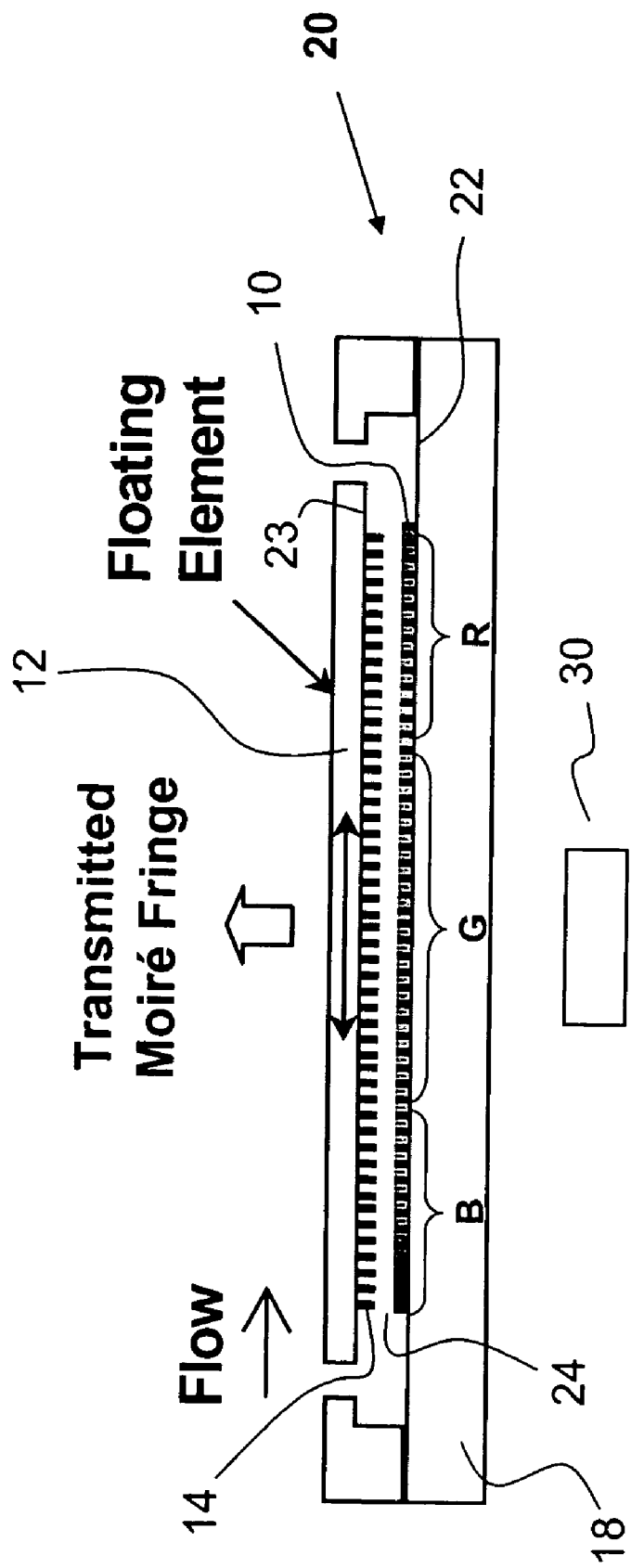
FIG. 5 is a schematic depiction of a color Moiré sensor with a channeled color light source.
Figure 6:
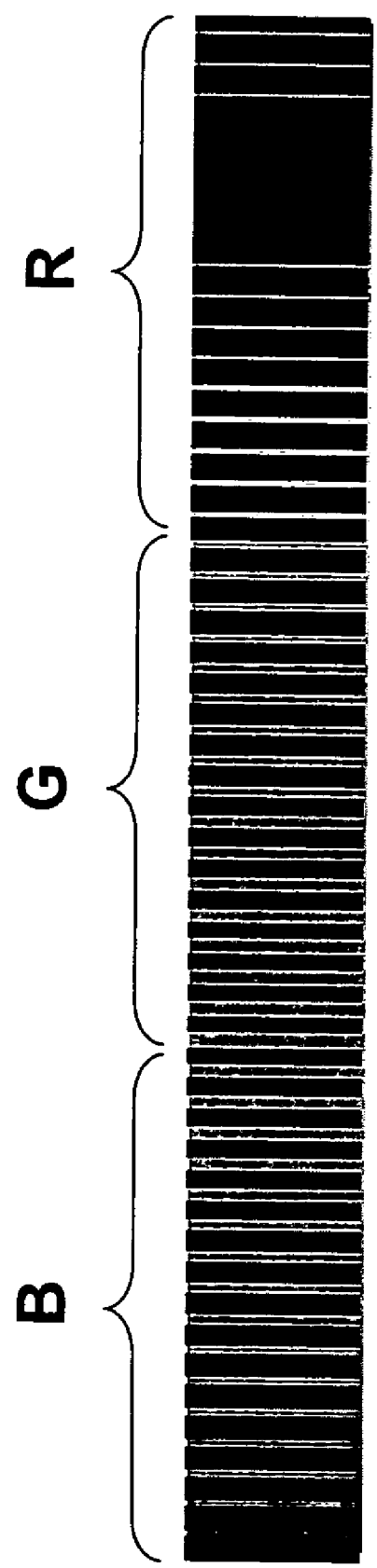
FIG. 6 is an example of the interference pattern of color Moiré fringe using the methodology of the present invention.
Figure 7:
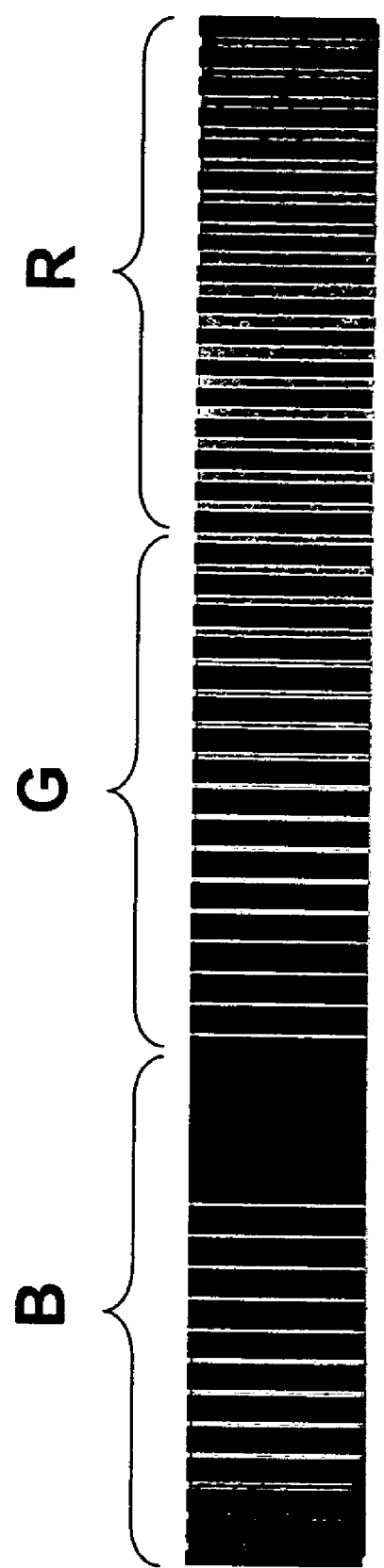
FIG. 7 is an example of the interference pattern of a shifted color Moiréfringe using the methodology of the present invention.

The color Moiré system/sensor 20 of the present invention is depicted in FIG. 5. In this figure, the spectrum of light ranging from blue designated as "B", to green designated as "G" and to red designated as "R" with the other spectral colors lying therebetween is transmitted through the Moiré mechanics layer 10 and is projected through the floating element 12 shown in FIG. 5. The incident uniform light of Sheplak's system is thus replaced by the colored light channels shown in FIG. 5. FIG. 6 shows an example of the interference pattern of the color Moiré fringe. In this Figure, the same B, G and R designations are used to represent the various colors. FIG. 7 is example of the interference pattern that has a different phase due to sensed shear stress. The same B, G and R designations are used in this Figure to represent the various colored portions of the projected light that are subsequently detected by the color sensor or pixel.

The output of this Moiré fringe is a result of the transmission of the colored light channels through the moiré opening. The summation of the total output can be stored in a single CCD pixel using the R,G,B format with 24-bit resolution. The least squares fitting procedure can be used in the R,G,B dimensions, each containing 8 bits of data to minimize the impact from noise; a procedure similarly adapted by the current prior art system.

Figure 9:
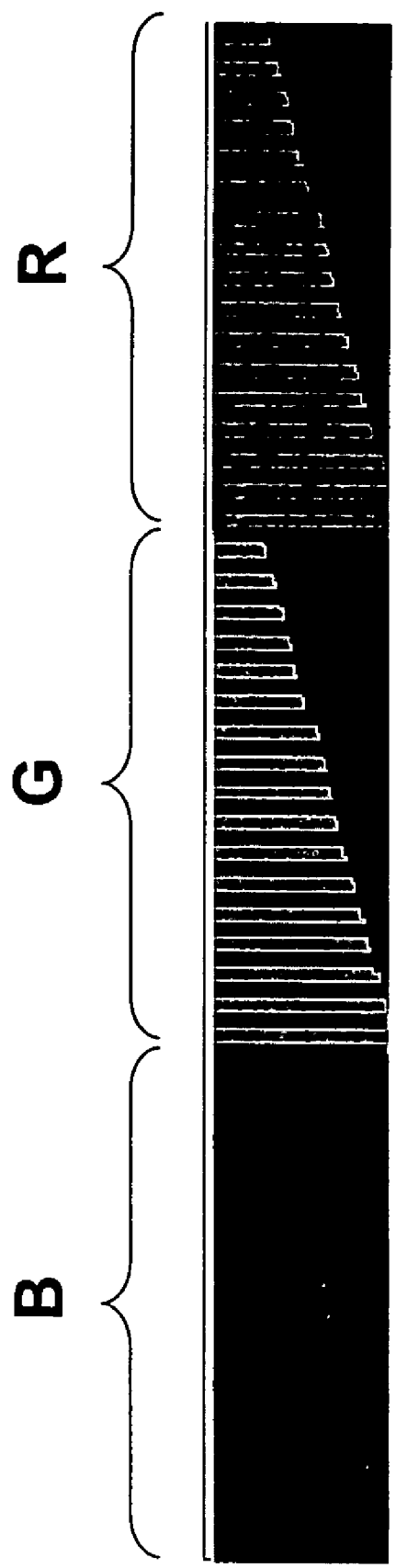
FIG. 9 is a schematic depiction of a possible method for generating the color and intensity coded channeled light source of the present invention.

As described by Horowitz et al., floating-element sensors directly measure the integrated force produced by the wall shear stress on a flush-mounted movable "floating" element. The floating-element is attached to either a displacement transducer or is part of a feedback force-rebalance configuration. For purposes of the instant invention, the displacement transducer or floating element 12 in FIG. 5 consists of optical gratings 14 on the backside of a floating element and 16 on the top surface of a support wafer 18 that superimpose to form a Moiré fringe which amplifies floating element 12 translation. Floating element 12 is suspended over a recessed gap 24, by silicon tethers not shown in FIG. 5 but well known in the art, that also serve as restoring springs. The displacement of floating element 12 is determined by Euler-Bernouli beam theory which is described in detail in the Horowitz et al. paper. Floating-element sensor 20 of the present invention, as depicted in FIG. 5, comprises a translucent floating-element 12, preferably of silicon, suspended above the surface of a translucent wafer 18, preferably of PYREX® (borosilicate glass) by the aforementioned tethers (not shown). The Moirépattern is preferably realized by patterning aluminum lines with a different pitch on both the bottom 23 of floating element 12 and on the upper surface 24 of PYREX® (borosilicate glass) wafer 18. When the device is illuminated from below, from light source 30, through PYREX® (borosilicate glass) wafer 18 and floating element 12, light (in the instant case colored light) is transmitted by the superposed top and bottom gratings, creating a translation-dependent Moiré fringe pattern. A Moiré fringe pattern occurs when two gratings of almost identical spatial period are superposed as shown in FIGS. 6 and 7. Depicted in FIG. 9 is a color and intensity coded channel light source suitable for use in the sensor of the present invention. Such a light source can be provided by a number of methods described briefly hereinafter and the provision of such color and intensity coded channel light sources is readily within the skill of the artisan skilled in the production of colored light sources of the type useful herein.

Figure 8:
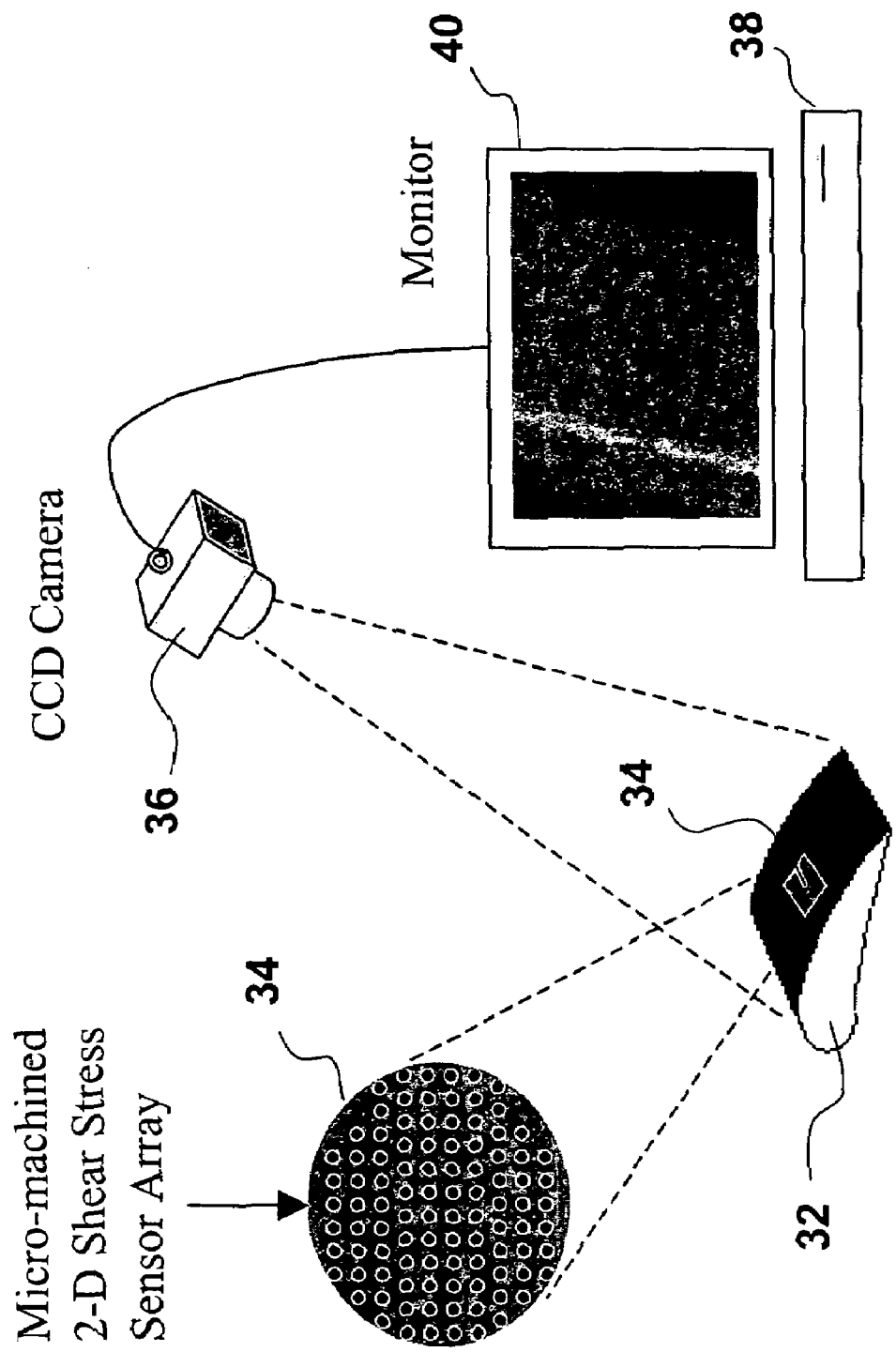
FIG. 8 is a schematic depiction of the application of the 2-D array color-Moiré shear stress measurement system of the present invention.

Thus, the color Moiré technique allows us to manufacture 2-D sensor arrays. A 2-D CCD camera can be used to record color images of the array. The color map of the images will be directly related to the shear stress. An example of the experimental setup is shown in FIG. 8. Referring now more specifically to FIG. 8, the 2-D sensor array of the present invention comprises a test base 32 having a 2-D micromachined shear-stress sensor array 34 mounted thereon and incorporating a mechanism for the generation of color coded and preferably intensity coded light. A color sensitive CCD camera 36 receives color information from shear-stress sensor array 34, transmits it to a computer 38 and attached monitor 40 for analysis and viewing. From the data acquired via CCD camera 36 as manipulated by computer 38 and displayed on monitor 40 it is possible to generate and record in two dimensions a color image of array 34 thereby allowing for projection of a two dimensional shear-stress map of an element undergoing testing on base 32.

Several methods can be used to introduce color coding. Among these are:

1) The Use of Spectrum-Color Wave Guides

The desired color in each channel is provided using a spectrum scale as is shown in FIG. 5. The spectrum can be produced by using a white light source and a prism and feeding the colored light into an individual channel.

2) The Use of Three LEDs with Different Wavelengths+ Wedges (Linear Scale Filters)

In this method, three laser diodes with different wavelengths, e.g. 488 nm, 532 nm, and 613 nm, are used. Each laser feeds one third of the channels as is shown in FIG. 9. A wedge mask is used to introduce linear light intensity variation so that each channel has a desired combination of color and intensity variation.

3) The Use of a White Light Source+Angle & Thickness Effects to Yield Color Coding In this case, no channel lighting is used. Instead, each bottom grating line serves as a reflector. A uniform white light source is used for illumination. The top surface for each grating is angled to a different thickness at its bottom. Each individual grating thus behaves like a small prism with a different angle and thickness that reflects different color light into the camera similar to the thin-oil-film technique described by Naughton, J. W. and Sheplak, M., "Modern Developments in Shear-Stress Measurement," Progress in Aerospace Sciences 38 (2002) 515-570, Pergamon which is incorporated herein by reference in its entirety as illustrative of the thin-oil-film technique.

Figure 2:
FIG. 2 is an example of the interference pattern of Moiré fringe.
Figure 3:
FIG. 3 is an example of the interference pattern of a shifted Moiré fringe.
Figure 4:
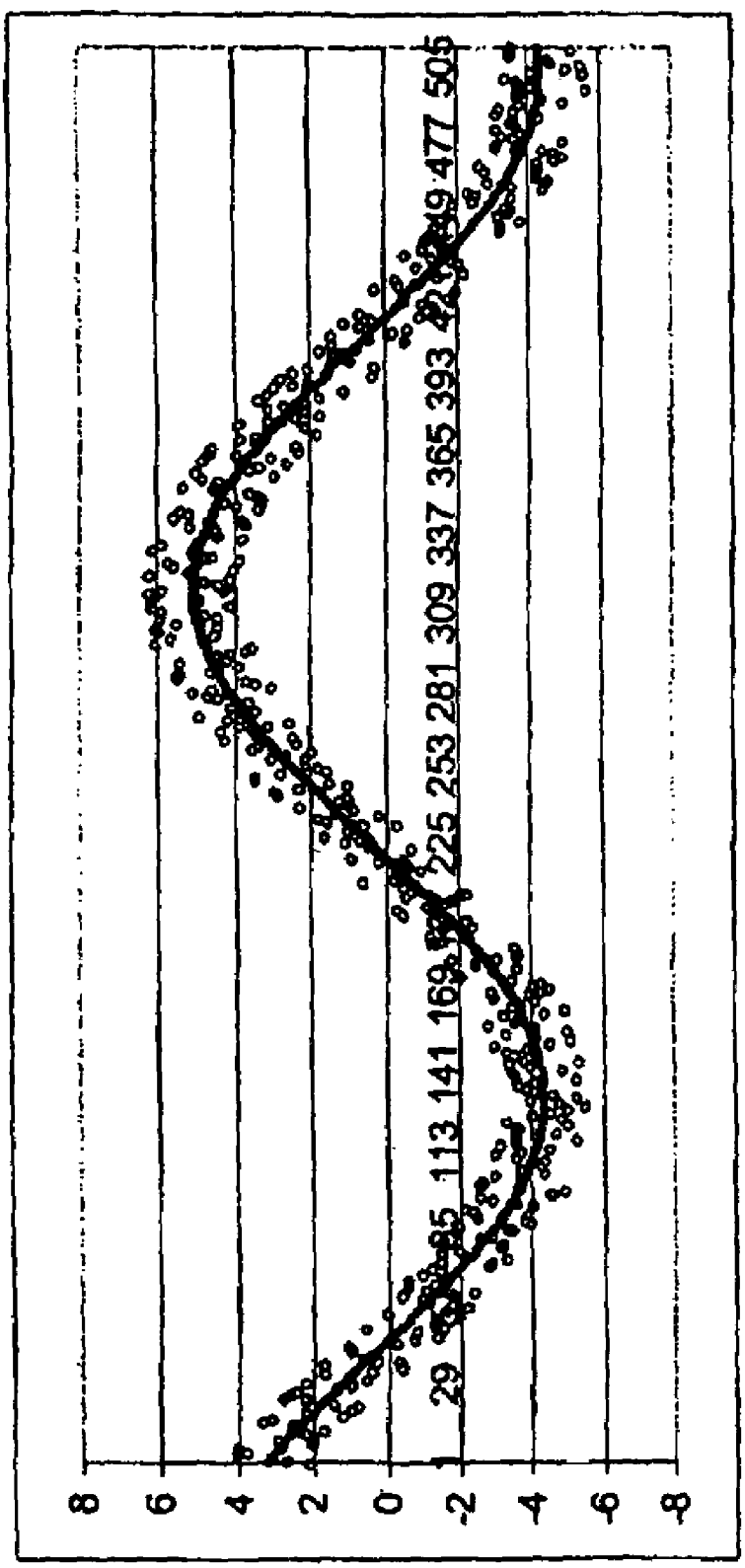
FIG. 4 is an example of the fringe data and the fitted curve for a phase shifting measurement.

The major sensor system improvements of the present invention are thus achieved by 1) embedding a channeled light ray as the light source as depicted in FIG. 5, and 2) implementing a 2-D color imaging setup as depicted in FIG. 8.

Thus there has been described a shear-stress sensor similar to but improved over the Moiré shear stress sensor unit developed by Sheplak that utilizes color coding to:

1. simplify the Sheplak et al. sensor;
2. enable the making of the Moiré stress sensor unit into 2-D array;
3. allow color imaging to map the 2-D shear stress distribution in a sample;
4. take advantage of low cost MEMS technology;
5. save costs associated with data acquisition and analysis;
6. miniaturize; and
7. allow usage of a fiber optic based setup to have a flat and thin shear stress sensor resulting in a less intrusive setup.

Although the invention described herein has been described largely in the context of its use in the field of shear stress analysis, it will be readily apparent to the skilled artisan that it will be similarly useful in any application where a pair of calibrated opposing grid patterns capable of relative movement are used in combination with the transmission of light therethrough to determine the amount and degree of such movement. One example of such use is in an accelerometer wherein the inertia of mass is used to gauge acceleration. The relative movement in such a device can be measured using color Moiré without the use of an expensive CCD camera system as would be required when the transmitted light is only white light and black and white or shades thereof are used in the determination of the measurement.

Similarly, in air and space applications, a plurality of "opposing" calibrated sensor grids can be placed in different locations, and optical fiber used to bring the color images of the individual grids into a bundle that is in turn connected to a single CCD camera to provide virtual opposition of the grids. Thus, a plurality of measurements that indicate the relative movement of a number of portions of an apparatus can be detected and quantified by a single CCD camera that acquires all of the data required to make such multiple measurements.

Thus, in the context of the present application and the appended claims, the use of the term "opposing" grids should be interpreted broadly to include applications where such "opposing" grids may or may not be in actual proximity to each other, but rather are brought into virtual proximity of each other by one mechanism or another.

As the invention has been described, it will be apparent to those skilled in the art that the same may be varied in many ways without departing from the spirit and scope of the invention. Any and all such modifications are intended to be included within the scope of the appended claims.

What is claimed is:

1. In a floating element shear-stress sensor comprising;
a translucent support wafer having an upper surface;
a first optical grating on the upper surface;
a translucent floating element juxtaposed above and separated from the translucent support wafer by a gap and having a lower surface addressing the upper surface;
a second optical grating on the lower surface; and
a light source that projects light through the translucent support wafer, the first optical grating, the second optical grating and the translucent floating element,
the improvement comprising the use of an array of discrete individually colored light sources as the light source.

2. The improved floating element shear-stress sensor of claim 1 wherein the color light source is a color coded channeled light source.

3. The improved floating element shear-stress sensor of claim 1 wherein the color light source is a color and intensity coded channeled light source.

4. The improved floating element shear-stress sensor of claim 1 wherein the translucent support comprises borosilicate glass and the floating element comprises silicon.

5. A floating element shear-stress sensor comprising;
a translucent support wafer having an upper surface;
a first optical grating on the upper surface;
a translucent floating element juxtaposed above and separated from the translucent support wafer by a gap and having a lower surface addressing the upper surface;
a second optical grating on the lower surface; and
a color light source that projects light through the translucent support wafer, the first optical grating, the second optical grating and the translucent floating element.

6. The floating element shear-stress sensor of claim 5 wherein the color light source is a color coded channeled light source.

7. The floating element shear-stress sensor of claim 6 wherein color coding is accomplished by the use of a mechanism selected from the group consisting of; spectrum color wave guides; a white light source combined with angle and thickness effects; and LEDs producing different wavelengths combined with linear scale filters to produce the color coded light.

8. The floating element shear-stress sensor of claim 5 wherein the color light source is a color and intensity coded channeled light source.

9. The floating element shear-stress sensor of claim 5 wherein the translucent support comprises borosilicate glass and the floating element comprises silicon.

10. Apparatus for the production of two dimensional color maps that are directly related to shear stress applied to a sample under evaluation comprising:
A) a base including a mechanism for the generation of colored light;
B) an array of floating element shear-stress sensors supported on said base and each of said floating element shear-stress sensors comprising;
a translucent support wafer having an upper surface;
a first optical grating on the upper surface;
a translucent floating element juxtaposed above and separated from the translucent support wafer by a gap and having a lower surface addressing the upper surface; and
a second optical grating on the lower surface;
the mechanism for the generation of colored light projecting coded colored light through the translucent support wafer, the first optical grating, the second optical grating and the translucent floating element;
C) a color sensitive CCD camera observing the array of floating element shear-stress sensors and transmitting such observations digitally;
D) a computer for the receipt, analysis and manipulation of the observations from the CCD camera attached to the CCD camera and capable of producing two dimensional color maps related to shear-stress observations; and
E) a mechanism for viewing the two dimensional color maps produced by the computer.

11. The apparatus of claim 10 wherein the color light source is a color coded channeled light source.

12. The apparatus of claim 11 wherein color coding is accomplished by the use of a mechanism selected from the group consisting of; spectrum color wave guides; a white light source combined with angle and thickness effects; and LED's producing different wavelengths combined with linear scale filters to produce color coded light.

13. The apparatus of claim 10 wherein the color light source is a color and intensity coded channeled light source.

14. The apparatus of claim 10 wherein the translucent support comprises borosilicate glass and the floating element comprises silicon.

15. In a device for measuring the relative movement of a pair of calibrated opposing grids via the transmission of light through openings in the calibrated opposing grids using a light source, the improvement comprising a color coded light source for the generation of light for transmission through openings in the opposing grids.

16. The device of claim 15 wherein the color coded light source is a color channeled light source.

17. The device of claim 15 wherein the color coded light source is a color and intensity coded light source.

18. The device of claim 15 wherein the calibrated opposing grids are remotely located but brought into virtual proximity through the use of fiber optics.

* * * * *